United States Patent [19]

Nakagima et al.

[11] Patent Number: 4,698,407

[45] Date of Patent: Oct. 6, 1987

[54] ONE-PACK CURING TYPE COMPOSITION

[75] Inventors: Masashi Nakagima, Chiba; Hiroshi Kojima, Ichihara; Tatsuro Matsui, Funabashi; Noriaki Dokoshi, Ichihara, all of Japan

[73] Assignee: Toray Thiokol Company Limited, Tokyo, Japan

[21] Appl. No.: 872,223

[22] Filed: Jun. 9, 1986

[30] Foreign Application Priority Data

Jun. 11, 1985 [JP] Japan .................................. 60-126927

[51] Int. Cl.$^4$ .............................................. C08G 77/06
[52] U.S. Cl. ....................................... 528/14; 528/15; 528/17; 528/18; 528/19; 528/21; 528/24; 528/30; 556/426
[58] Field of Search .................... 556/426; 528/14, 15, 528/17, 18, 19, 21, 24, 30

[56] References Cited

U.S. PATENT DOCUMENTS 3,282,901 11/1966 Warner et al. ..................... 528/387
3,344,161 9/1967 Moedritzer et al. ................ 556/426
4,092,293 5/1978 Harris et al. ........................ 528/374
4,289,867 9/1981 Martin .................................. 528/30
4,366,307 12/1982 Singh et al. ......................... 528/373

Primary Examiner—Melvyn I. Marquis
Attorney, Agent, or Firm—Austin R. Miller

[57] ABSTRACT

Disclosed is a one-pack curing type composition having an excellent storage stability and rapid curing property after application. The composition comprises a polymer having in the molecule at least two structures represented by the formula:

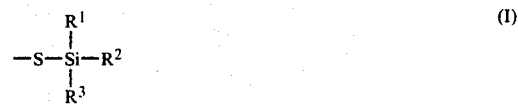

(I)

wherein $R^1$, $R^2$ and $R^3$ independently represent a group selected from an alkyl group having 1 to 6 carbon atoms, a phenyl group and a chloromethyl group, and an oxidizing agent.

18 Claims, No Drawings

ONE-PACK CURING TYPE COMPOSITION

BACKGROUND OF THE INVENTION

1. Field of the Invention

The present invention relates to a one-pack curing type composition which is cured by moisture in the air. More particularly, it relates to a one-pack curing type composition comprising as indispensable components a polymer containing at last two silylthioether linkages in the molecule and an oxidizing agent, which is naturally cured by moisture in the air and is utilizable as a sealing material and the like.

2. Description of the Related Art

Since a polymer having at least two thiol groups in the molecule can be easily converted to a higher polymer by oxidizing the contained thiol groups to form a disulfide linkage, this polymer is combined with various oxidizing agents and widely used as a sealing material, a caulking material, an adhesive and the like.

As the thiol group-containing polymer of this type, there can be mentioned a liquid polysulfide polymer disclosed in U.S. Pat. No. 2,466,963; a thiol-terminated polyoxyalkylene polyol disclosed in Japanese Examined Patent Publication No. 47-48,279; a polymercaptan disclosed in U.S. Pat. No. 4,092,293; a mercaptan-terminated liquid polythioether disclosed in U.S. Pat. No. 4,366,307; a poly(oxyalkylene)polyester-poly(monosulfide)-polythiol disclosed in Japanese Examined Patent Publication No. 52-34,677; a butadiene-mercaptan polymer disclosed in U.S. Pat. No. 3,282,901; a mercaptan-containing polymer disclosed in U.S. Pat. No. 3,523,985; and, a mercapto-organopolysiloxane disclosed in Japanese Examined Patent Publications No. 55-39,261 and No. 60-3,421.

These thiol group-containing polymers are mixed with various inorganic peroxides, organic peroxides, polyepoxy compounds, polyolefin compounds or polyisocyanate compounds and are used as curing compositions. However, in practical applications, these compositions are generally used in the form of a two-pack type composition, wherein a main component and a curing agent are stored separately.

As the one-pack type composition comprising a thiol group-containing polymer as the main component, there are known a composition utilizing an amine-adsorbed molecular sieve, as disclosed in Japanese Examined Patent Publication No. 42-11,502, and a composition utilizing a curing system using oxygen in the air, as disclosed in Japanese Examined Patent Publication No. 47-48,279 or No. 60-3,422. The former composition has a problem, however, such that in order to maintain a good storage stability and, simultaneously, ensure a high curing rate after application, an advanced technique is necessary for selecting an oxidizing agent or incorporating a curing catalyst, and in the case of the latter composition, if the oxygen permeability of a composition is low, curing is not advanced to the interior thereof, and the kinds of applicable polymers are limited.

SUMMARY OF THE INVENTION

It is a primary object of the present invention to provide a one-pack curing type composition, for which all thiol group-containing polymers can be used, without the addition of an advanced mixing technique to the techniques already known in the field of two-pack type compositions comprising a thiol group-containing polymer and an oxidant as basic components.

Another object of the present invention is to provide a one-pack curing type composition having an excellent storage stability and rapid curing property after application.

In accordance with the present invention, there is provided a one-pack curing type composition which comprises a polymer having in the molecule at least two structures represented by the following general formula:

wherein $R^1$, $R^2$ and $R^3$ independently represent a group selected from an alkyl group having 1 to 6 carbon atoms, a phenyl group, and chloromethyl group, and an oxidizing agent.

DESCRIPTION OF THE PREFERRED EMBODIMENTS

The composition of the present invention comprises as indispensable components a polymer having terminal groups represented by the general formula (I), and an oxidizing agent.

Since the polymer of the present invention contains at least two structures represented by the general formula (I) in the molecule, thiol group-containing polymers heretofore mainly used for two-pack type compositions can be rendered inactive to oxidizing agent when insulated from water and moisture. In short, storage stability can be given to the one-pack type curing composition. The group represented by the general formula (I) is readily hydrolyzed by moisture in the air and is converted to a thiol group. The formed thiol group is oxidized by the oxidizing agent incorporated in advance to form a disulfide linkage, whereby the polymer is cured. Namely, the composition of the present invention can be utilized as a one-pack curing type composition.

As the terminal group represented by the general formula (I), a terminal group wherein $R^1$, $R^2$ and $R^3$ independently represent an alkyl group having 1 or 2 carbon atoms is preferred, and a group of the following formula:

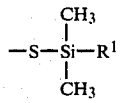

is more preferred because the starting material is easily available and the curing rate is high.

Preferably, the molecular weight of the polymer used in the present invention is 500 to 15,000. If the molecular weight is lower than 500, the proportion of the terminal group represented by the formula (I) is increased, and at the curing step, the terminal group is decomposed and volatilized to cause a decrease of the volume. On the other hand, if the molecular weight is higher than 15,000, the viscosity of the polymer is increased or the polymer becomes solid, and formation of the composition becomes difficult.

Preferably, the polymer used in the present invention is in the liquid form, since the composition is then easily formed as the polymer is easy to handle.

If the polymer used in the present invention contains at a part of the skeleton thereof $-(-CH_3CH_2OCH_2OCH_2CH_2S_x-)_l$ (in which l is an integer of 5 to 50, and x is an integer of 1 to 4 and an average value thereof is 2), a rubbery substance formed by curing the composition of the present invention has an excellent rubbery elasticity, strength at break, and elongation, and also water resistance and heat resistance. If the polymer is represented by the following general formula:

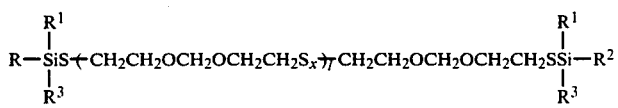

wherein $R^1$, $R^2$, $R^3$, x and l are as defined above, the foregoing properties are further improved. A polymer having the following structure is especially preferred:

wherein l and x are as defined above.

Furthermore, preferably

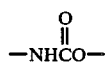

and/or

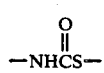

is contained at a part of the skeleton of the polymer used in the present invention, because the rubbery elasticity of a rubbery substance obtained by curing such a composition is excellent. This property is especially remarkably in a polymer represented by the following formula:

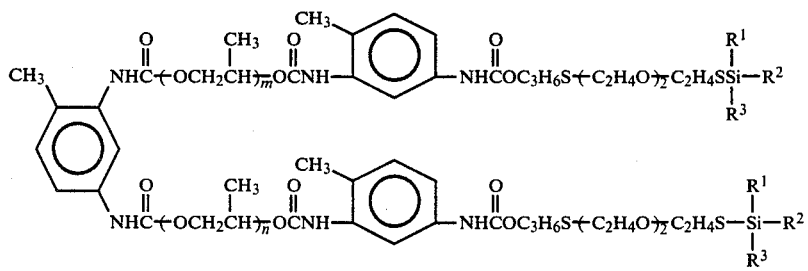

wherein $R^1$, $R^2$ and $R^3$ are as defined above, and m is an integer of 2 to 100 and n is an integer of 2 to 100.

Moreover, preferably $-(-R-O-)_p$ is contained at a part of the skeleton of the polymer used in the present invention (in the above formula, R represents an alkylene group having 2 to 3 carbon atoms and p is an integer of 2 to 100), because the rubbery elasticity of a rubbery substance obtained by curing such a composition is excellent. This property is remarkably improved if the polymer has the following structure:

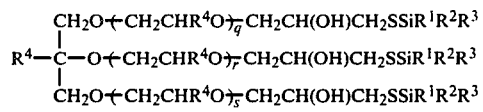

wherein $R^1$, $R^2$ and $R^3$ are as defined above, each of q, r and s is an integer of 2 to 100, and $R^4$ represents a hydrogen atom or a methyl group.

Preferably, the polymer used in the present invention should contain at a part of the skeleton thereof the following structure:

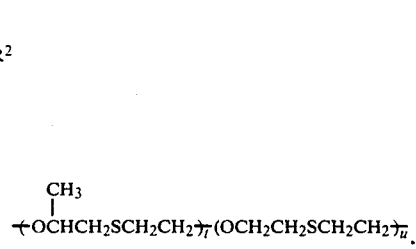

wherein each of t and u is an integer of 2 to 100, because a rubbery substance obtained by curing such a composition has an excellent rubbery elasticity and weatherability. A polymer represented by the following general formula is especially preferred:

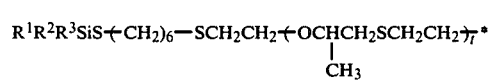

wherein $R^1$, $R^2$, $R^3$, t and u are as defined above.

The polymer used in the present invention may be synthesized, for example, by reacting a known polymer having at least two thiol group in the molecule with a commercially available silylating agent, to convert the thiol groups to trialkylsilylthio groups.

As the known thiol group-containing polymer used as the starting material, there can be mentioned a liquid polysulfide polymer disclosed in U.S. Pat. No. 2,466,963. Polymers having the following structure:

$$HS-(-CH_2CH_2OCH_2OCH_2CH_2S_x-)_lCH_2CH_2OCH_2OCH_2CH_2SH \quad (II)$$

wherein l and x are as defined above, are widely used.

Sometimes a small amount of a cross-linking agent is introduced in the polysulfide compound represented by the general formula (II) at the synthesis step, and a peculiar structure derived from this cross-linking agent can be present in the skeleton.

As other examples of the known polymer, there can be mentioned a polyoxyalkylene-polyol disclosed in Japanese Examined Patent Publication No. 47-48,279, which has a structure represented by the following formula:

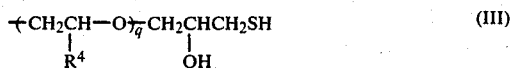
$$\text{+CH}_2\text{CH}-\text{O}\text{)}_q\text{CH}_2\text{CHCH}_2\text{SH} \quad \text{(III)}$$
$$\quad\ \ |\ \ \qquad\qquad |$$
$$\quad\ \ R^4\ \qquad\qquad OH$$

wherein q and $R^4$ are as defined above; a polymercaptan disclosed in U.S. Pat. No. 4,092,293, which has a structure represented by the following general formula:

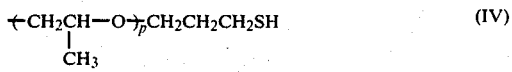
$$\text{+CH}_2\text{CH}-\text{O}\text{)}_p\text{CH}_2\text{CH}_2\text{CH}_2\text{SH} \quad \text{(IV)}$$
$$\quad\ \ |$$
$$\quad\ \ CH_3$$

wherein p is as defined above; a mercaptan-terminated liquid polymer disclosed in U.S. Pat. No. 3,923,748, which has a structure represented by the following general formula:

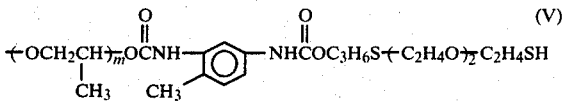
$$\qquad\qquad\qquad O\qquad\qquad\qquad O \qquad\qquad \text{(V)}$$
$$\qquad\qquad\qquad \|\qquad\qquad\qquad \|$$
$$\text{+OCH}_2\text{CH})_m\text{OCNH}-\bigcirc-\text{NHCOC}_3\text{H}_6\text{S(C}_2\text{H}_4\text{O)}_{\overline{z}}\text{C}_2\text{H}_4\text{SH}$$
$$\quad\ \ |\qquad\qquad\qquad\quad |$$
$$\quad\ \ CH_3\qquad\qquad\quad\ CH_3$$

wherein m is as defined above; a mercaptan-terminated liquid polythioether disclosed in U.S. Pat. No. 4,366,307, which is represented by the following general formula:

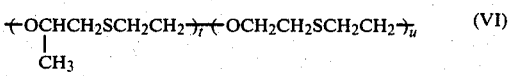
$$\text{+OCHCH}_2\text{SCH}_2\text{CH}_2)_t\text{+OCH}_2\text{CH}_2\text{SCH}_2\text{CH}_2)_u \quad \text{(VI)}$$
$$\quad\ \ |$$
$$\quad\ \ CH_3$$

wherein t and u are as defined above; a poly(oxyalkylene)-polyester-poly(monosulfide)-polythiol disclosed in Japanese Examined Publication No. 52-34,677; a butadiene-mercaptan polymer disclosed in U.S. Pat. No. 3,282,901; a mercaptan-containing polymer disclosed in U.S. Pat. No. 3,523,985; and, a mercapto-organopolysiloxane disclosed in Japanese Examined Patent Publications No. 55-39,261 and No. 60-3,421. Any of these polymers can be used as the starting material.

As the method for converting thiol groups of these known thiol group-containing polymers to trialkylsilylthio groups, there can be mentioned a method in which the polymer is reacted with a halosilane represented by the following general formula:

$$R^1R^2R^3SiX \quad \text{(VII)}$$

wherein $R^1$, $R^2$ and $R^3$ are as defined above, and x represents a halogen atom, in an amount equal to or larger than the amount equimolar to the thiol groups contained in the polymer and triethylamine.

As specific examples of the halosilane, there can be mentioned trimethylchlorosilane, trimethylbromosilane, trimethyliodosilane, dimethylphenylchlorosilane, and chloro-methyldimethylchlorosilane. But, in view of the reactivity with the thiol group and the ease of removal of by-products, and from the economical viewpoint, trimethylchlorosilane is especially preferred.

As another means for converting the thiol groups of the known thiol group-containing polymer to trimethylsilylthio groups, there can be mentioned a method in which the starting polymer is reacted with N,O-bis(trimethylsilyl)acetamide or N,N'-bis(trimethylsilyl)urea in amount of at least 0.5 mole per mole of the thiol group contained in the starting polymer, and a method in which the starting polymer is reacted with hexamethyldisilazane in an amount of at least 0.5 mole, preferably 1 to 3 moles, per mole of the thiol group contained in the starting polymer in the presence of an appropriate reaction catalyst. As the reaction catalyst, there may be used substances disclosed in J. Org. Chem., 47, 3966 (1982). Among these substances, imidazole or saccharin is preferably used in an amount of 0.001 to 0.1 equivalent to the starting polymer.

Any of the foregoing methods may be adopted for converting thiol groups to trialkylsilylthio groups, but where the starting known polymer contains a functional group reactive with the silylating agent, such as a hydroxyl group or an amino group, namely, where a polymer having a structure of the general formula (III) or (V) is used as the starting polymer, and excessive amount of silylating agent must be used, and the method becomes operationally and economically disadvantageous.

The other indispensable component of the present invention is an oxidizing agent. Substances which have heretofore been used as curing agents for two-pack type compositions comprising a thiol group-containing polymer as the main component can be used as the oxidizing agent. As specific examples of the oxidizing agent, there may be used inorganic peroxides such as $ZnO_2$, $FeO_2$, $PbO_2$, $MgO_2$, $CaO_2$, $MnO_2$, $TeO_2$, $SeO_2$, $SnO_2$, $Pb_3O_4$, $BaO_2$, $LiO_2$, and $SrO_2$; inorganic oxides such as $ZnO$, $FeO$, $PbO$, $Fe_2O_3$, $Sb_2O_3$, $MgO$, $CoO$, $CaO$, $CuO$, and $BaO$; inorganic oxidizing agents such as $Na_2CrO_4$, $K_2CrO_4$, $Na_2Cr_2O_7$, $K_2Cr_2O_7$, $NaClO_4$, $NaBO_2.H_2O_2$, $K_2C_2O_6$, $KMnO_4$, and sodium percarbonate; organic peroxides such as benzoyl peroxide, dicumyl peroxide, cumene hydroperoxide, t-butyl hydroperoxide, t-butyl perbenzoate sodium peracetate, and urea peroxide; and, organic oxidizing agent such as nitrobenzene, dinitrobenzene and p-quinone dioxime. Of these, $PbO_2$ is most widely used.

In the composition of the present invention, the oxidizing agent may be used in an amount similar to the amount of the oxidizing agent used as the curing agent for conventional two-pack type compositions, and the optimum amount differs according to the kind of oxidizing agent used. However, it is generally preferred that the oxidizing agent be used in an amount of 1 to 50 parts by weight per 100 parts by weight of the polymer. If the amount of the oxidizing agent is too small, the curing property of the composition is degraded, and if the amount of the oxidizing agent is too large, the storage stability is degraded. It is especially preferred that the oxidizing agent be used in an amount of 2 to 25 parts by weight in the case of an inorganic peroxide, 5 to 50 parts by weight in the case of an inorganic oxide or inorganic oxidizing agent, 2 to 25 parts by weight in the case of an organic peroxide, or 1 to 10 parts by weight in the case of an organic oxidizing agent, per 100 parts by weight of the polymer.

In order to increase the economical advantage and improve the adaptability to the operation of applying the composition, and the physical properties of the cured composition, fillers and plasticizers customarily used for conventional two-pack type compositions may be incorporated into the composition of the present invention in addition to the above-mentioned two indispensable components. But, since a one-pack curing type composition having an excellent storage stability is intended in the present invention, a filler or plasticizer not containing a functional group such as a hydroxyl group is preferably used. Preferably, a filler or plasticizer which is not acidic or alkaline is used after it has been sufficiently dehydrated.

In the present invention, a powdery molecular sieve may be added so as to enhance the storage stability of the composition, and a curing promoter may be added to increase the curing speed.

In some cases, curing can be promoted if an amine is added to the composition of the present invention, and for this purpose, a tertiary amine is preferred. For example, there can be mentioned triethylamine, tripropylamine, tributylamine, pyridine, N-methyl-2-pyrrolidone, dimethylaniline, benzyldimethylamine, hexamethylenetetramine, 2,4,6-trisdimethylaminomethylphenol, and diphenylguanidine. Among these, hexamethylenetetramine, 2,4,6-trisdimethylaminomethylphenol, and diphenylguanidine are not volatile and are especially preferred. Good results are obtained when the amine is added in an amount of 0.01 to 3.0 parts by weight to the composition comprising 100 parts by weight of the polymer and 1 to 50 parts by weight of the oxidizing agent. If the amount of the amine is too large, the storage stability is degraded, and if the amount of the amine is too small, the intended curing-promotion effect is not attained.

Synthesis examples illustrating the synthesis of polymers used in the present invention, and examples illustrating compositions according to the present invention, will now be described.

SYNTHESIS EXAMPLE 1

Preparation of a polymer represented by the following structural formula:

(CH₃)₃SiS(̵CH₂CH₂OCH₂OCH₂CH₂S$_x$)̵$_l$CH₂CH₂OCH₂OCH₂CH₂SSi(CH₃)₃ wherein l is an integer of 5 to 50 and has an average value of 23, and x is an integer of 1 to 4 and has an average value of 2.

A reaction vessel having a capacity of 2 l was charged with 1000 g (0.25 mole) of a liquid polysulfide polymer (Thiokol LP-55 supplied by Toray-Thiokol) represented by the following molecular formula:

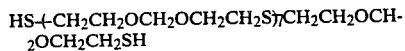

wherein l and x are as defined above, and 250 ml of benzene, and the mixture was stirred to form a solution. Then, 50.6 g (0.5 mole) of triethylamine was dropped into the solution and the solution was stirred for 30 minutes, and 54.3 g (0.5 mole) of trimethylchlorosilane was dropped into the solution over a period of 30 minutes while maintaining the temperature of the reaction mixture at room temperature. The reaction mixture was then further stirred for 1 hour, and the reaction mixture was filtered to remove triethylamine hydrochloride formed as the by-product. Benzene was removed by distillation under reduced pressure to obtain 755 g of the intended polymer.

SYNTHESIS EXAMPLE 2

Preparation of the same polymer as that prepared in Synthesis Example 1.

An eggplant type flask having a capacity of 2 l was charged with 1000 g (0.25 mole) of the same liquid polysulfide polymer as used in Synthesis Example 1 and 66.1 g (0.325 mole) of N,O-bistrimethylsilylacetamide, and the mixture was heated to 100° C. and stirred for 3 hours. Then, 500 ml of ethylbenzene was added to the reaction mixture to form a homogeneous solution. Acetamide formed as the by-product was removed by distillation under a reduced pressure. When this removing operation using ethylbenzene was repeated 5 times, the same polymer as obtained in Synthesis Example 1, which contained us acetamide at all, was obtained.

SYNTHESIS EXAMPLE 3

Preparation of a polymer represented by the following structural formula:

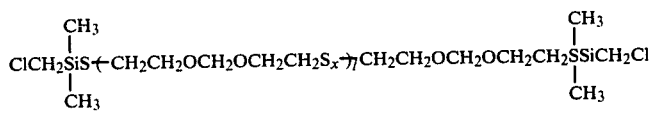

wherein l is an integer of 5 to 50 and has an average value of 23, and x is an integer of 1 to 4 and has an average value of 2.

A reaction vessel having a capacity of 500 ml was charged with 80 g (0.02 mole) of the same liquid polysulfide polymer as used in Synthesis Example 1 and 200 ml of benzene, and the mixture was stirred to form a solution. Then, 4.5 g (0.044 mole) of triethylamine was dropped into the solution and the mixture was stirred for 10 minutes, and 6.3 g (0.04 mole) of chloromethyldimethylchlorosilane was added dropwise while maintaining the temperature of the reaction mixture at room temperature. Stirring was further conducted for 2 hours and the reaction mixture was filtered to remove triethylamine hydrochloride formed as the by-product. Benzene was removed by distillation to obtain 82 g of the intended polymer.

SYNTHESIS EXAMPLE 4

Preparation of a polymer represented by the following structural formula:

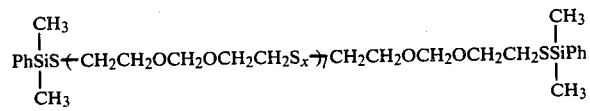

wherein Ph represents a phenyl group, l is an integer of 5 to 50 and has an average value of 23, and x is an integer of 1 to 4 and has an average value of 2.

A reaction vessel having a capacity of 500 ml was charged with 80 g (0.02 mole) of the same liquid polysulfide polymer as used in Synthesis Example 1 and 200 ml of benzene, and the mixture was stirred to form a solution. Then, 4.5 g (0.044 mole) of triethylamine was dropped into the solution and the solution was stirred for 10 minutes, and 7.5 g (0.044 mole) of dimethylphenylchlorosilane was added dropwise while maintaining the temperature of the reaction mixture at room temperature. Stirring was further conducted for 1.5 hours, and the reaction mixture was filtered to remove triethylamine hydrochloride formed as the by-product. Benzene was removed by distillation under reduced pressure to obtain 83 g of the intended polymer.

SYNTHESIS EXAMPLE 5

Preparation of a polymer represented by the following structural formula:

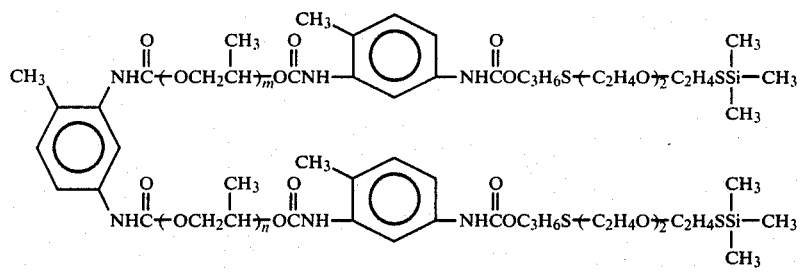

wherein m is an integer of 25 to 35 and has an average value of 30, and n is an integer of 23 to 35 and has an average value of 30.

A reaction vessel having a capacity of 500 ml was charged with 44 g (0.01 mole) of a polymer (Permapol ® Polymer P-780 supplied by Product Research and Chemical) represented by the following structural formula:

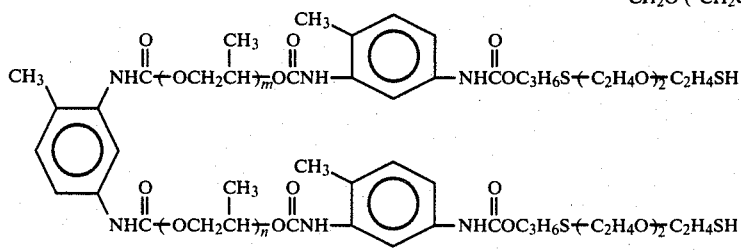

wherein m and n are as defined above, which had a viscosity of 1400 poise and a thiol group content of 1.5% by weight, 200 ml of benzene, and 17 g (0.084 mole) of N,O-bistrimethylacetamide, and the mixture was heated and refluxed for 3 hours. Benzene was removed by distillation under a reduced pressure, and 50 ml of ethylbenzene was added to the residue to form a homogeneous solution. Acetamide formed as the by-product was removed by distillation under a reduced pressure. This removing operation using ethylbenzene was repeated 3 times, and the intended polymer which contained no acetamide at all was obtained.

SYNTHESIS EXAMPLE 6

Preparation of a polymer represented by the following structural formula:

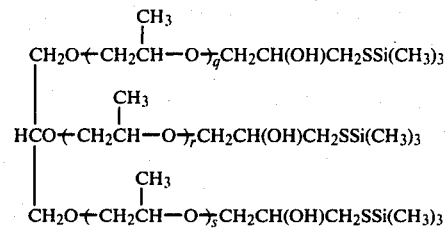

wherein each of q, r and s is a positive integer of 2 to 6 and has an average value of 3.5.

A reaction vessel having a capacity of 500 ml was charged with 83 g (0.1 mole) of a polymer (Dion 3800 LC supplied by Diamond Shamrock) represented by the following structural formula:

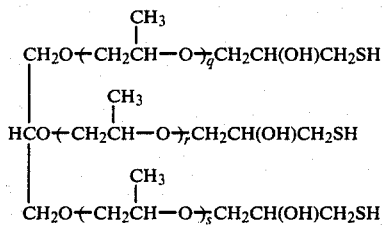

wherein q, r and s are as defined above, which had a viscosity of 150 poise and a thiol group content of 12% by weight, and 200 ml of benzene, and the mixture was stirred to form a solution. Then, 71 g (0.7 mole) of triethylamine was added into the solution and the solution was stirred for 20 minutes, and 76 g (0.7 mole) of trimethylchlorosilane was added dropwise while maintaining the temperature of the reaction mixture at room temperature. Stirring was further conducted for 4.5 hours, and the reaction mixture was filtered to remove triethylamine hydrochloride formed as the by-product. Benzene was removed by distillation under a reduced pressure to obtain the intended polymer.

SYNTHESIS EXAMPLE 7

Preparation of a polymer represented by the following structural formula:

$$CH_3SiS\text{-}(CH_2)_6SCH_2CH_2\text{-}(OCHCH_2SCH_2CH_2)_t\text{-}(OCH_2CH_2SCH_2CH_2)_u\text{-}(CH_2)_4SSi\text{-}CH_3$$

with $CH_3$ groups on Si and a $CH_3$ branch on the OCH unit.

wherein t is a positive integer of 3 to 20 and has the average value of 7, and u is a positive integer of 5 to 50 and an average value of 18.

An eggplant type flask having a capacity of 200 ml was charged with 35 g (0.01 mole) of a polymer (Permapol® Polymer P-3 supplied by Product Research and Chemical) represented by the following structural formula:

$$HS\text{-}(CH_2)_6SCH_2CH_2\text{-}(OCHCH_2SCH_2CH_2)_t\text{-}(OCH_2CH_2SCH_2CH_2)_u\text{-}(CH_2)_4SH$$

with a $CH_3$ branch on the OCH unit.

wherein t and u are as defined above, which had a viscosity of 500 poise, 100 ml of toluene, 8.1 g (0.05 mole) of hexamethyldisilazane and 0.01 g of saccharin. The mixture was heated to 100° C. and stirred for 6 hours. Toluene, an excessive amount of hexamethyldisilazane and ammonia formed as a by-product were removed by distillation under a reduced pressure to obtain the intended polymer.

EXAMPLE 1

A paste having a composition shown in Table 1 was prepared, and was heated and dried under a reduced pressure.

TABLE 1

| Ingredients | Amounts (parts by weight) |
|---|---|
| Filler (CaCO₃) | 120 |
| Plasticizer (chlorinated paraffin) | 97 |
| Oxidizing agent (PbO₂) | 7 |
| Powdery Molecular Sieve 5A | 5 |

To 229 parts of this paste was added 100 parts by weight of the polymer obtained in Synthesis Example 2, and these materials were mixed together while insulated from water and air to obtain a thixotropic liquid composition. The composition was sealed in a tube, and the storage stability was evaluated by measuring, at respective temperatures, a time at which extrusion of the content became impossible because of an increase of the viscosity or from solidification.

A one-surface bead having a width of 12 mm and a depth of 15 mm was prepared by using this composition, and was exposed to the temperature and humidity shown in Table 2 for a certain period. A sample was then cut and the thickness of the cured portion from the surface was measured as the criterion of the curing property. The obtained results are shown in Table 2.

TABLE 2

| Items | Example No. 1 | 2 | 3 | 4 | 5 |
|---|---|---|---|---|---|
| Storage Stability | | | | | |
| 70° C. | 15 hours | — | — | — | — |
| 50° C. | 7 days | — | — | — | — |
| 20° C. | >90 days | 30 days | >90 days | 7 days | >40 days |
| Curing Property (mm) | | | | | |
| 35° C., 80% RH* × 1 day | 3.6 | — | — | — | — |
| 35° C., 80% RH × 2 days | 5.5 | — | — | — | — |
| 35° C., 80% RH × 3 days | 7.0 | — | — | — | — |
| 20° C., 55% RH × 3 days | 3.1 | 3.0 | 2.2 | 4.5 | 1.0 |
| 20° C., 55% RH × 5 days | 4.1 | — | 3.2 | — | — |
| 20° C., 55% RH × 7 days | 5.0 | — | 4.0 | — | 2.0 |
| 10° C., 40% RH × 7 days | 2.3 | — | — | — | — |
| 10° C., 40% RH × 14 days | 4.0 | — | — | — | — |

Note
*Relative humidity
Measurement conditions: temperature = 20° C., pulling speed = 50 mm/min.

An H-shaped sample for measuring the physical properties was prepared by using the composition, and after predetermined aging, the tensile characteristics were measured. The measuring conditions and obtained results are shown in Table 3.

TABLE 3

| Aging Conditions | Items | Example 1 |
|---|---|---|
| 35° C., 80% RH × 7 days | 50% Modulus (kg/cm²) | 1.2 |
| | 150% Modulus (kg/cm²) | 1.8 |
| | Strength at break (kg/cm²) | 2.6 |
| | Elongation (%) | 400 |
| 35° C., 80% RH × 7 days + water immersion (20° C.) × 7 days | 50% Modulus (kg/cm²) | 1.1 |
| | 150% Modulus (kg/cm²) | 1.7 |
| | Strength at break (kg/cm²) | 2.6 |
| | Elongation (%) | 450 |
| 35° C., 80% RH × 7 days + heating (90° C.) × 7 days | 50% Modulus (kg/cm²) | 1.0 |
| | 150% Modulus (kg/cm²) | 1.7 |
| | Strength at break (kg/cm²) | 2.6 |
| | Elongation (%) | 270 |

EXAMPLE 2

The storage stability and curing property of a composition obtained by mixing 100 parts by weight of the polymer obtained in Synthesis Example 3 with 200 parts by weight of the paste shown in Table 1 were measured in the same manner as described in Example 1. The obtained results are shown in Table 2.

EXAMPLE 3

The same operation and measurement as described in Example 2 were conducted with respect to the polymer obtained in Synthesis Example 4. The obtained results are shown in Table 2.

EXAMPLE 4

The same operation and measurement as described in Example 2 were conducted with respect to the polymer obtained in Synthesis Example 5. The obtained results are shown in Table 2.

EXAMPLE 5

The same operation and measurement as described in Example 2 were conducted with respect to the polymer obtained in Synthesis Example 6. The obtained results are shown in Table 2. Although each of the compositions of Examples 1 through 4 was converted to a rubbery substance by curing, when the composition of this Example 5 was cured, a hard resinous substance was obtained.

EXAMPLE 6

To 100 parts by weight of the polymer obtained in Synthesis Example 1 were added 100 parts by weight of a preliminarily dehydrated filler (CaCO), 100 parts by weight of a plasticizer (chlorinated paraffin), 5 parts by weight of manganese dioxide and 5 parts by weight of a powdery molecular sieve (5A), and these materials were mixed together while insulated from water and air to obtain a thixotropic liquid composition. When the composition was exposed in a room maintained at a temperature of 20° C. and a relative humidity of 55%, the composition was cured and converted to a rubbery substance after a passage of 7 days. On the other hand, when the composition was sealed in a tube and the tube was stored in this chamber, the composition remained liquid even after the passage of 7 days.

EXAMPLE 7

To 100 parts by weight of the polymer obtained in Synthesis Example 1 were added 100 parts by weight of a preliminarily filler ($CaCO_3$), 100 parts by weight of a plasticizer (chlorinated paraffin), 10 parts by weight of a 60% chlorinated paraffin solution of t-butyl hydroperoxide, 0.2 part by weight of 2,4,6-tris(dimethylaminomethyl)phenol and 5 parts by weight of a powdery molecular sieve (5A), and the mixture was treated in the same manner as described in Example 6 to obtain a liquid composition. When the composition was exposed in a room maintained at a temperature of 20° C. and a relative humidity of 55%, the composition was cured and converted to a rubbery substance after a passage of 3 days. In contrast, when the composition was sealed in a tube and stored in the same chamber, the composition remained liquid even after the passage of 3 days.

EXAMPLE 8

A paste comprising 100 parts by weight of a filler ($CaCO_3$) and 90 parts by weight of a plasticizer (chlorinated paraffin) was prepared and was heated and dried under a reduced pressure. Then, 100 parts by weight of the polymer obtained in Synthesis Example 1, 10 parts by weight of zinc dioxide and 1 part by weight of hexamethylenetetramine were added to 190 parts of the paste, and these materials were mixed together while insulated from water and air to form a liquid composition. By using the thus-obtained composition, a one-surface bead was prepared in the same manner as described in Example 1. When the bead was exposed in a room maintained at a temperature of 20° C. and a relative humidity of 55%, a rubbery film was formed on the surface of the bead after a passage of 2 days and the thickness of the rubbery film was increased to 3.7 mm after 7 days' exposure. When the composition was sealed in a tube and stored in the same room, the composition remained liquid even after the passage of 90 days. When the composition sealed in a tube was stored in a thermostat maintained at 70° C., the composition remained liquid for 2 days but was solidified to a rubbery substance on the third day.

EXAMPLE 9

A liquid composition was prepared in the same manner as described in Example 8 except that 10 parts by weight of barium oxide was used instead of 10 parts by weight of zinc dioxide, and a one-surface bead was prepared from this composition. The bead was placed in a thermostat chamber maintained at a temperature of 35° C. and a relative humidity of 80%, and a rubbery film was formed on the surface after 10 hours and in the portion having a thickness of 1.2 mm from the surface, the composition was cured and converted to a rubbery substance after a passage of 3 days. In contrast, when the composition sealed in a tube was stored in a thermostat tank maintained at 70° C., the composition remained liquid even after the passage of 7 days.

EXAMPLE 10

A liquid composition was prepared in the same manner as described in Example 8 except that 30 parts by weight of sodium perborate represented by $NaBO_2.H_2O_2.3H_2O$ was used instead of 10 parts by weight of zinc dioxide and the amount of hexmethylenetetramine was changed to 3 parts by weight. The curing property and storage stability of the composition were examined in the same manner as described in Example 9. A rubbery covering film was formed in 10 hours at a temperature of 35° C. and a relative humidity of 80%, and after a passage of 3 days under these conditions, the portion having a thickness of 4.5 mm was cured and converted to a rubbery substance. The composition sealed in a tube remained liquid even after the passage of 3 days at 70° C.

EXAMPLE 11

A liquid composition was prepared in the same manner as described in Example 8 except that 9 parts by weight of cumene hydroperoxide was used instead of 10 parts by weight of zinc oxide and 0.3 part by weight of diphenylguanidine was used instead of 1 part by weight of hexamethylenetetramine. The curing property and storage stability were examined in the same manner as described in Example 9. A rubber covering film was formed in 10 hours at a temperature of 35° C. and a relative humidity of 80%, and the portion having a thickness of 1.8 mm from the surface was cured and converted to a rubbery substance after a passage of 3 days under the above conditions. The composition sealed in a tube remained liquid even after the passage of 3 days at 70° C.

EXAMPLE 12

A liquid composition was prepared in the same manner as described in Example 8 except that 2 parts by weight of paraquinone dioxime was used instead of 10 parts by weight of zinc dioxide and 1 part by weight of diphenylguanidine was used instead of 1 part by weight of hexamethylenetetramine. The curing property and storage stability of the composition were examined in the same manner as described in Example 9. A rubbery covering film was formed in 3 days at a temperature of 35° C. and a relative humidity of 80%. The composition sealed in a tube remained liquid even after 7 days at 70° C.

EXAMPLE 13

The polymer obtained in Synthesis Example 7 was treated in the same manner as described in Example 2 to obtain a thixotropic liquid composition. When the composition was exposed in a room maintained at a temperature of 20° C. and a relative humidity of 55%, the composition was cured and converted to a rubbery substance after a passage of 7 days. On the other hand, when the composition was sealed in a tube and stored in the same chamber, the composition remained liquid even after the passage of 7 days.

We claim:

1. A one-pack curable composition which comprises a polymer having a molecular weight of 500 to 15,000 and having in the molecular at least two structures, each represented by the following general formula:

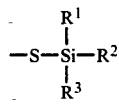

(I)

wherein $R^1$, $R^2$ and $R^3$ independently represent a group selected from an alkyl group having 1 to 6 carbon atoms, a phenyl group or a chloromethyl group, and an oxidizing agent.

2. A one-pack curable composition as set forth in claim 1, wherein the polymer is liquid at room temperature.

3. A one-pack curable composition as set forth in claim 1, wherein the polymer contains in the molecule at least two structures represented by the following general formula:

$$-S-\underset{\underset{CH_3}{|}}{\overset{\overset{CH_3}{|}}{Si}}-R'$$

wherein R' represents a group selected from an alkyl group having 1 to 6 carbon atoms, a phenyl group or a chloromethyl group.

4. A one-pack curable composition as set forth in clam 1, wherein a portion of the composition is represented by the following general formula:

$$-(CH_2CH_2OCH_2OCH_2CH_2S_x)_l-$$

wherein l is an integer of 5 to 50, and x is an integer of 1 to 4 and has an average value of 2.

5. A one-pack curable composition as set forth in claim 1, wherein the polymer is represented by the following general formula:

$$R^2-\underset{\underset{R^3}{|}}{\overset{\overset{R^1}{|}}{Si}}S+CH_2CH_2OCH_2OCH_2CH_2S_x)_l-CH_2CH_2OCH_2OCH_2CH_2SSi-\underset{\underset{R^3}{|}}{\overset{\overset{R^1}{|}}{}}R^2$$

wherein $R^1$, $R^2$ and $R^3$ independently represent a group selected from an alkyl group having 1 to 6 carbon atoms, a phenyl group or a chloromethyl group, l is an integer of 5 to 50, and x is an integer of 1 to 4 and has an average value of 2.

6. A one-pack curable composition as set forth in claim 1, wherein a portion of the composition has a structure selected from the group consisting of those which are represented by the following formulae:

$$-NH\overset{\overset{O}{\|}}{C}O- \text{ and } -NH\overset{\overset{O}{\|}}{C}S-$$

7. A one-pack curable composition as set forth in claim 1, wherein the polymer is represented by the following general formula:

$$CH_3\underset{}{}\overset{}{}NH\overset{\overset{O}{\|}}{C}+OCH_2CH)_m OCNH-\underset{}{\bigcirc}-\underset{\underset{CH_3}{}}{\overset{\overset{CH_3}{}}{\bigcirc}}-NH\overset{\overset{O}{\|}}{C}OC_3H_6S+C_2H_4O)_n C_2H_4S\underset{\underset{R^3}{|}}{\overset{\overset{R^1}{|}}{Si}}-R^2$$

$$NH\overset{\overset{O}{\|}}{C}+OCH_2CH)_m OCNH-\underset{}{\bigcirc}-\underset{\underset{CH_3}{}}{\overset{\overset{CH_3}{}}{\bigcirc}}-NH\overset{\overset{O}{\|}}{C}OC_3H_6S+C_2H_4O)_n C_2H_4S-\underset{\underset{R^3}{|}}{\overset{\overset{R^1}{|}}{Si}}-R^2$$

wherein $R^1$, $R^2$ and $R^3$ independently represent a group selected from an alkyl group having 1 to 6 carbon atoms, a phenyl group or a chloromethyl group, m is an integer of 2 to 100 and n is an integer of 2 to 100.

8. A one-pack curable composition as set forth in claim 1, wherein a portion of the composition is represented by the following general formula:

$$+R-O)_p$$

wherein R represents an alkylene group having 2 to 3 carbon atoms and p is an integer of 2 to 100.

9. A one-pack curable composition as set forth in claim 1, wherein the polymer is represented by the following general formula:

$$CH_2O+CH_2CHR^4O)_q CH_2CH(OH)CH_2SSiR^1R^2R^3$$
$$R^4-\underset{|}{C}-O+CH_2CHR^4O)_r CH_2CH(OH)CH_2SSiR^1R^2R^3$$
$$CH_2O+CH_2CHR^4O)_s CH_2CH(OH)CH_2SSiR^1R^2R^3$$

wherein $R^1$, $R^2$ and $R^3$ independently represent a group selected from an alkyl group having 1 to 6 carbon atoms, a phenyl group or a chloromethyl group, $R^4$ represents a hydrogen atom or a methyl group, q is an integer of 2 to 100, r is an integer of 2 to 100 and s is an integer of 2 to 100.

10. A one-pack curable composition as set forth in claim 1, wherein a portion of the composition is represented by the following general formula:

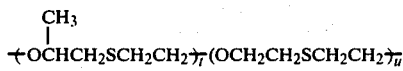

wherein t is an integer of 2 to 100 and u is an integer of 2 to 100.

11. A one-pack curable composition as set forth in claim 1, wherein the polymer is represented by the following general formula:

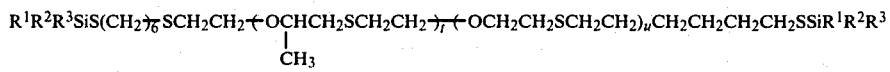

wherein $R^1$, $R^2$ and $R^3$ independently represent a group selected from an alkyl group having 1 to 6 carbon atoms, a phenyl group or a chloromethyl group, t is an integer of 2 to 100 and u is an integer of 2 to 100.

12. A one-pack curable composition as set forth in claim 1, wherein the oxidizing agent is at least one compound selected from the group consisting of $ZnO_2$, $FeO_2$, $PbO_2$, $MgO_2$, $CaO_2$, $MnO_2$, $TeO_2$, $SeO_2$, $SnO_2$, $Pb_3O_4$, $BaO_2$, $LiO_2$, and $SrO_2$.

13. A one-pack curable composition as set forth in claim 1, wherein the oxidizing agent is at least one compound selected from the group consisting of $ZnO$, $FeO$, $PbO$, $Fe_2O_3$, $Sb_2O_3$, $MgO$, $CoO$, $CaO$, $CuO$ and $BaO$.

14. A one-pack curable composition as set forth in claim 1, wherein the oxidizing agent is at least one compound selected from the group consisting of $Na_2CrO_4$, $K_2CrO_4$, $Na_2Cr_2O_7$, $K_2Cr_2O_7$, $NaClO_4$, $NaBO_2\cdot H_2O_2$, $K_2C_2O_6$, $KMnO_4$.

15. A one-pack curable composition as set forth in claim 1, wherein the oxidizing agent is at least one compound selected from the group consisting of benzoyl peroxide, dicumyl peroxide, cumene hydroperoxide, t-butyl hydroperoxide, t-butyl perbenzoate, sodium peracetate, and urea peroxide.

16. A one-pack curable composition as set forth in claim 1, wherein the oxidizing agent is at least one compound selected from the group consisting of nitrobenzene, dinitrobenzene and paraquinone dioxime.

17. A one-pack curable composition as set forth in claim 1, wherein the oxidizing agent is incorporated in an amount of 1 to 50 parts by weight per 100 parts by weight of the polymer.

18. A one-pack curable composition as set forth in claim 1, which further comprises a tertiary amine.

* * * * *